3,297,789
HALF ESTERS OF ARYL DIALKANOLAMINES AS PROMOTERS FOR UNSATURATED POLYESTER RESINS
Frank Fekete, 4403 McKenzie Drive, Monroeville, Pa. 15146, and Patrick J. Keenan, 15 Markham Road, Princeton, N.J. 08540
No Drawing. Filed Oct. 8, 1965, Ser. No. 494,265
9 Claims. (Cl. 260—864)

This application is a continuation-in-part of copending application 101,347 filed April 7, 1961, now abandoned.

This invention relates to polymerizable unsaturated polyester resin compositions and their polymerization. More particularly this invention relates to the inclusion in such compositions of small, but activating quantities of polymerization promoters which, in the presence of peroxy polymerization initiators, reduce gelation time and hardness development time of such compositions. The promoters are the half-ester products of a dicarboxylic acid anhydride and an aryl dialkanol amine.

BACKGROUND

The half-ester promoter materials with which this invention is concerned are prepared in the manner described in the aforesaid copending patent application S.N. 101,-347. However the present half-ester promoters are not carboxylic salts as erroneously stated in the said copending application. Subsequent analysis of the materials indicates that indeed the present half-ester promoters are not ammonium salts and exhibit no characteristic salt-like properties. It is now believed that the "carboxylic salts" described in the aforementioned copending application S.N. 101,347 derived their utility from the presence of the aryl dialkanolamine alone regardless of the presence or absence of the "salt-forming" carboxylic acids or dicarboxylic acids. The "salt-forming" acids simply were inert or perhaps reactive with the polyester ingredients.

PRIOR ART

Various promoters of polymerization of unsaturated polyester resin compositions are known. U.S. Patents 2,593,787 and 2,740,765 describe quaternary ammonium salts as promoters. Yet U.S. Patent 2,646,416 describes ammonium salts as inhibitors. U.S. Patent 2,480,928 describes N,N-dialkyl aryl tertiary monoamines as promoters. British Patent 757,989 describes polyesters which are co-condensed with substituted tertiary amines which are chemically incorporated in the polyesters.

UNSATURATED POLYESTER RESINS

Unsaturated polyester resin compositions find wide utility in the plastics industry. These compositions contain
(a) An unsaturated polyester, for example, ethylene glycol maleate-phthalate;
(b) An ethylenically unsaturated monomer, for example, styrene;
(c) A gelation inhibitor, for example, hydroquinone.

The compositions can be polymerized by the addition of small but effective amounts of polymerization initiator, for example, benzoyl peroxide. Frequently promoters are added to the compositions to accelerate the polymerization initiating action of the peroxy catalysts. Diethylaniline is a typical promoter.

The principal object of this invention is to provide an unsaturated polyester resin composition which contains as a promoter a dicarboxylic half-ester of an aryl dialkanolamine. The resin compositions of this invention exhibit virtually no "gel-time drift," i.e., there is little change in the gelation time of such compositions between formulation and use, regardless of the intervening storage time. The present resin compositions, furthermore exhibit a rapidly developed gelatin and a rapidly developed hardness. The present resin compositions preferably are suitably inhibited against premature gelation by the inclusion of conventional gelation inhibitors such as quinones, hydroquinones and phenols, e.g., 6-t-butyl catechol.

The unsaturated polyester resin compositions with which the present invention is concerned are well known in the art. Such compositions usually contain from about 40 to 90 percent by weight of an unsaturated polyester and from about 60 to 10 percent by weight of ethylenically unsaturated monomer. Such fundamental compositions are fully described in U.S. Patents 2,646,416, Parker; 2,740,765, Parker; 2,593,787, Parker.

UNSATURATED POLYESTER

Polyesters usually are prepared by the esterification of dihydric alcohols and dicarboxylic acids or dicarboxylic acid anhydrides. In order to prepare an unsaturated polyester, at least a portion of the dicarboxylic acid or anhydride must contain alpha-beta-ethylenic unsaturation. Typical alpha-beta-ethylenic unsaturated acids include:

Maleic acid, fumaric acid, aconitic acid, mesaconic acid, citraconic acid, ethyl maleic acid, pyrocinchoninic acid, xeronic acid, itaconic acid, and endomethylene tratrahydrophthalic acid.

Where the anhydrides of the above-listed acids are available, they may be used in place of all or a part of the alpha-beta-ethylenic unsaturated dicarboxylic acid.

Usually the unsaturated polyester also contains substantial amounts of dicarboxylic acids or dicarboxylic acid anhydrides which do not possess alpha-beta-ethylenic unsaturation. Such dicarboxylic acids include:

Phthalic acid, tetrachlorophthalic acid, succinic acid, adipic acid, suberic acid, azelaic acid, sebacic acid, dimethyl succinic acid, chlorinated derivatives of the above acids, terephthalic acid, and isophthalic acid.

Where the anhydrides of the above listed acids are available, they may be used in place of all or a part of the dicarboxylic acid.

Typical dihydric alcohols which may be employed in the formulation of the unsaturated polyesters are:

Ethylene glycol, diethylene glycol, triethylene glycol, polyethylene glycol, 1,3-dipropanediol, 1,2-propylene glycol, dipropylene glycol, and butylene glycol.

Halogen substituted glycols, e.g., mono-chlor derivatives also may be employed.

The unsaturated polyesters are formed usually by esterifying a reaction mixture containing a slight molar excess of the dihydric alcohol with a molar quantity of the dicarboxylic acids and anhydrides. A relatively low acid number is desirable, usually from about 10 to about 50, although even lower acid numbers may be preferred.

ETHYLENIC UNSATURATED MONOMERS

The resulting unsaturated polyester is admixed with an ethylenically unsaturated monomer such as:

Styrene, alpha-methyl styrene, p-methyl styrene, divinyl benzene, indene, vinyl acetate, methyl methacrylate, methyl acrylate, allyl acetate, diallyl phthalate, diallyl succinate, diallyl adipate, diallyl sebacate, diethylene glycol bis (allyl carbonate), triallyl phosphate, and vinyl chloride. From about 10 to about 60 percent by weight of the final polymerizable composition comprises the ethylenically unsaturated monomer, the balance comprising the unsaturated polyester.

Usually a small, but effective quantity of a gelation inhibitor is added to the polymerizable composition. Such inhibitors include quinones, hydroquinones, phenols in the amount of about 50 p.p.m. to about 2.0 percent by weight of the resin formulation.

DICARBOXYLIC HALF-ESTERS OF ARYL DIALKANOLAMINES

The dicarboxylic half-esters with which this invention is concerned are formed by reaction of an aryl dialkanolamine with a dicarboxylic acid anhydride. The aryl dialkanolamine has the following formula:

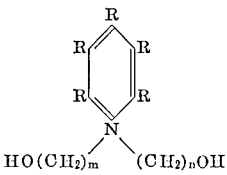

where $m$, $n$ are integers from 1 through 6 and R is selected from the class consisting of hydrogen and lower alkyl radicals. A preferred aryl dialkanolamine is phenyl diethanolamine. Suitable dicarboxylic acid anhydride includes:

(1) Maleic anhydride
(2) Phthalic anhydride
(3) Tetrachlorophthalic anhydride
(4) Hexachloro-endo-methylene tetrahydrophthalic anhydride.
(5) Endomethylene tetrahydrophthalic anhydride.

The dicarboxylic half-esters are prepared by direct reaction between the basic aryl dialkanolamine and the dicarboxylic acid anhydride.

We have found that dicarboxylic half-esters of aryl dialkanolamines are excellent promoters of peroxy polymerization initiators. The present dicarboxylic half-esters do not greatly affect the gelation inhibiting properties of the customary gelation inhibitors such as quinones, hydroquinones and phenols. Accordingly unsaturated polyester compositions which contain both hydroquinone and one of the present dicarboxylic half-esters can be stored for substantial periods without premature gelation. Furthermore, the unsaturated polyester resin compositions which contain the present dicarboxylic half-esters do not exhibit "gel time drift"; that is, the gel time of the resin does not increase between formulation and use regardless of the intervening period of storage.

The present dicarboxylic half-esters have a relatively low vapor pressure and hence a low toxicity in utilization. The dicarboxylic half-esters are compatible in the usual unsaturated polyester resin compositions.

We have found that the dicarboxylic half-esters of aryl dialkanolamines however (1) do not possess gelation inhibiting properties, and
(2) are excellent promoters for any peroxy initiators.

The present dicarboxylic half-esters may be prepared by intermixing the dicarboxylic anhydride with a molar equivalent of the aryl dialkylolamine and allowing the mixture to stand at ambient temperatures for several days. The formation of the half-ester may be accelerated by warming the mixture to about 80° to 100° C. for one to two hours. Preferably the resultant half-ester is diluted with a suitable solvent such as propylene glycol. The function of the solvent is to solubilize the dicarboxylic half-esters (if solid) and to simplify the addition of the dicarboxylic half-esters into the polyester resin composition.

Where N-phenyldiethanolamine and maleic anhydride are employed, the ingredients, being solid substances, are merely ground together in a mortar with a pestle and allowed to stand for several days.

The dicarboxylic half-esters of this invention can be visually represented as follows: (using phenyl diethanolamine and maleic acid to form the dicarboxylic half-ester:

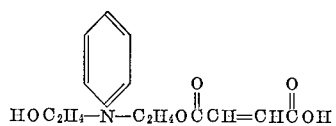

In general the dicarboxylic half-esters of this invention are soluble in propylene glycol. Solutions of the salts in a suitable solvent such as propylene glycol are added to the unsaturated polyester resin compositions so that from about 0.2 to about 3.0 and preferably from about 0.5 to 2.5 percent by weight of the resulting resin formulation comprises the dicarboxylic half-esters. Where less than about 0.5 percent by weight is employed, the material exerts only slight improvement in gelation time and hardness development time. When more than about 2.5 percent by weight of the dicarboxylic half-ester is employed, the hardness development time is increased. With great excesses of the present dicarboxylic half-ester additive, virtually instantaneous gelation results (upon the addition of the peroxy initiator) but the gelled resin fails to develop hardess, i.e., fails to cure.

Examples

I. An unsaturated polyester was prepared by esterification of

|  | Mols |
| --- | --- |
| Maleic anhydride | 0.4 |
| Phthalic anhydride | 0.6 |
| Diethylene glycol | 0.25 |
| Propylene glycol | 0.75 |

The unsaturated polyester was diluted with monomeric styrene in the ratio of 7 parts by weight of polyester to 3 parts by weight of styrene.

II. An unsaturated polyester was prepared according to Example I. The polyester was diluted with monomeric styrene in the ratio of 6 parts by weight of polyester to 4 parts by weight of styrene.

INHIBITION STUDIES

In order to evaluate the utility of the present dicarboxylic half-esters as gelation inhibitors, a series of accelerated gel tests was conducted with the resin composition of Example II. In some instances, the resin composition contained none of the conventional gelation inhibitors (e.g., hydroquinone); in some instances the resin contained the present dicarboxylic half-esters which were specifically the dicarboxylic half-ester of phenyl diethanolamine and maleic anhydride. In other instances, the resin composition contained for comparison, a half ester of phenol monoethanolamine and maleic anhydride. In some instances the resin composition contained 0.5 percent by weight of a 6 percent solution of cobalt naphthenate which is frequently employed in combination with the hydroperoxide type of peroxy polymerization initiators. The results of the tests are tabulated in the following Table I.

TABLE I.—INHIBITION OF GELATION—RESULTS OF GELATION TESTS WITH UNCATALYZED RESIN COMPOSITION (I.E., CONTAINING NO POLYMERIZATION INITIATOR)—RESIN II.

| Test No. | Hydroquinone Inhibitor, p.p.m. | Dicarboxylic Half-Ester, weight | Additive,[1] weight | Accelerated Gel Time |
|---|---|---|---|---|
| 1 | 0 | 150 p.p.m. A | 0 | 20 hrs. |
| 2 | 0 | 0.5% A | 0 | 2 hrs. |
| 3 | 0 | 2.0% A | 0 | 2 hrs. |
| 4 | 0 | 5.0% A | 0 | 4 hrs. |
| 5 | 150 | 0 | 0 | 5 days. |
| 6 | 150 | 0 | 0.5% | Do. |
| 7 | 150 | 0.5% A | 0 | 3 days. |
| 8 | 150 | 0.5% A | 0.5% | Do. |
| 9 | 150 | 0.5% H | 0 | 1 day. |
| 10 | 150 | 0.5% H | 0.5% | 3 days. |

A—Ester of phenyl diethanolamine and maleic anhydride.
H—Ester of phenyl monoethanolamine and maleic anhydride.
[1] Cobalt naphthenate.

From inspection of Table I, it is apparent that the present dicarboxylic half-esters exhibit no inhibiting effects whatsoever in unsaturated polyester resin compositions, but instead, appear to accelerate gelation. The first gel articles appeared in the compositions after only two hours in Tests 2 and 3 of Table I. The use of hydroquinone alone in the resin composition (Test 5) delayed the appearance of first gel particles for 5 days, regardless of whether the resin contained cobalt naphthenate or not (compare Tests 5 and 6).

The inclusion of both hydroquinone and the present dicarboxylic half-esters resulted in the appearance of first gel particles after 3 days regardless of whether the composition contained cobalt naphthenate or not (compare Tests 7 and 8). The analogous material, a phenyl monoalkanolamine half-ester of maleic anhydride, in combination with the hydroquinone, yielded first gel particles after only one day in the absence of cobalt naphthenate and in 3 days in the presence of cobalt naphthenate.

Thus, from Tests 1 through 4, it appears that the present dicarboxylic half-esters have in themselves no inhibiting properties.

GELATION AND CURING PROPERTIES

In order to establish promoting effects of the present dicarboxylic half-esters for unsaturated polyester resin compositions, resin compositions as herein described were prepared. Each composition contained 150 p.p.m. of hydroquinone as gelation inhibitor. In all instances the polymerization initiator was 1.0 percent by weight of methyl ethyl ketone hydroperoxide and 0.5 percent by weight of a 6 percent solution of cobalt naphthenate. Room temperature cures of the various test compositions were observed with results reported in the following Table II.

TABLE II.—ROOM TEMPERATURE CURING PROPERTIES OF UNSATURATED POLYESTER RESIN COMPOSITIONS

| Resin | Promoter | Gel Time, Minutes | Barcol Hardness | |
|---|---|---|---|---|
| | | | Value | Time, minutes |
| I | A | 4 | 35–40 | 45 |
| I | B | 4 | 33–38 | 45 |
| I | C | 6 | 32–38 | 30 |
| I | D | 4 | 18–26 | 30 |
| I | E | 57 | 0 | 1,440 |
| II | F | 14 | 20–25 | 30 |
| II | G | 6 | 28–34 | 30 |
| II | H | 9 | 0–3 | 240 |

The promoters employed in the tests of Table II were as follows:

A—half-ester of phenyldiethanolamine and maleic anhydride
B—half-ester of phenyldiethanolamine and phthalic anhydride
C—half-ester of phenyldiethanolamine and tetrachlorophthalic anhydride
D—half-ester of phenyldiethanolamine and hexachloroendomethylene tetrahydrophthalic anhydride
E—half-ester of diethanolamine and maleic anhydride
F—diethylaniline
G—phenyldiethanolamine
H—half-ester of phenylmonoethanolamine and maleic anhydride From inspection of Table II, it will be observed that the dicarboxylic half-esters of this invention (A through D inclusive) result in resin compositions having excellent curing properties. However, a half-ester of diethanolamine and maleic anhydride (E) failed to develop hardness in 24 hours following gelation. Corresponding values for diethylaniline (F) also indicate that this material possesses excellent promoting properties as is well known in the art. Phenyldiethanolamine (G), by itself, is excellent as a promoter but somewhat objectionable from the standpoint of resin storage stability.

GEL TIME DRIFT STUDIES

The dicarboxylic half-esters of this invention exhibit substantially no gel time drift when added to unsaturated polyester resin compositions. To a sample of the resin composition of Example I was added 300 p.p.m. of hydroquinone and 0.5% by weight of the dicarboxylic half-ester (A) of phenyldiethanolamine and maleic anhydride. The sample was tested for gel time drift with and without the further addition of 0.5% by weight of a 6 percent solution of cobalt naphthenate. The results of those tests are set forth in the following Table III.

TABLE III.—GEL TIME DRIFT STUDIES OF UNSATURATED POLYESTER RESIN COMPOSITIONS

| Resin | Cobalt Naphthenate, Wt. Percent | Promoter | Gel Time Measurement | |
|---|---|---|---|---|
| | | | Taken at Days | Gel Time, minutes |
| II | 0 | 0.5% A | 0 | 19 |
| | | | 15 | 18 |
| | | | 30 | 18 |
| II | 0.5 | 0.5% A | 0 | 25 |
| | | | 7 | 25.5 |
| | | | 15 | 21 |
| | | | 30 | 21 |

It will be observed from inspection of Table III that the gel time values of the resin compositions were substantially unchanged throughout the periods over which the gel times were measured. The actual changes were in the direction of very slightly decreased gel times which is opposite to the objectionable gel time drift in the direction of increased gel times.

EFFECT OF CONCENTRATION OF DICARBOXYLIC HALF-ESTERS

In order to establish the effect of the concentration of the present dicarboxylic half-esters on the gelation and hardening properties of unsaturated polyester resin compositions, a series of tests was conducted with the resin composition of Example I. The resin contained 300 p.p.m. of hydroquinone as inhibitor. The initiator for the tests was 1 percent by weight of benzoyl peroxide. The promoter in these tests was (A) the phenyldiethanolamine half-ester of maleic anhydride. The results of the tests are set forth in the following Table IV.

TABLE IV.—EFFECT OF THE CONCENTRATION OF DICARBOXYLIC HALF-ESTERS IN UNSATURATED POLYESTER RESIN COMPOSITIONS ON CURING PROPERTIES

| Promoter Concentration, Weight Percent | Gel Time, minutes | Barcol Hardness | |
|---|---|---|---|
| | | Value | Minutes |
| 0.25 | 142 | 20-30 | 177 |
| 0.5 | 58 | 30-35 | 78 |
| 1.0 | 50 | 30-40 | 70 |
| 2.0 | 32 | 30-40 | 52 |
| 3.0 | 23 | 6-20 | 240 |
| 4.0 | 19 | 0-20 | 420 |
| 5.0 | 16 | 0-3 | 180 |

It will be observed from Table IV that the gel time for unsaturated polyester resin compositions generally decreases with increasing concentrations of promoter in the form of the present dicarboxylic half-esters. This general decrease in gel time is not necessarily characteristic of all unsaturated polyester resin compositions or with all peroxy initiators. Some resin compositions with certain peroxy initiators will exhibit a general decrease in gel time with increased concentration of the present dicarboxylic half-esters from a range of 0.2 through about 3.0 percent by weight; thereafter, further increases in the concentration of the present dicarboxylic half-esters results in a corresponding increase in the gel time.

By controlling the quantity of the present dicarboxylic half-esters, it is possible to regulate the gel time of a polyester resin composition.

The Barcol Hardness maximizes in the range between about 0.5 and 2.5 percent by weight of the present dicarboxylic half-esters in the resin composition.

We claim:
1. A polymerizable composition including (A) polymerizable polyester of glycol and dicarboxylic acid wherein at least a portion of the dicarboxylic acid possesses alpha-beta ethylenic unsaturation; (B) monomeric cross-linking reagent having at least one terminal ethylenic group; (C) a small activating amount of a half-ester formed from (a) dicarboxylic acid anhydride selected from the class consisting of the anhydrides of maleic, phthalic, tetrachlorophthalic, endomethylene tetrahydrophthalic and hexachloroendomethylene tetrahydrophthalic acids, and (b) an aryl dialkanolamine; said composition being polymerizable upon the addition of a peroxy initiator in a small but effective amount.

2. The composition of claim 1 wherein the aryl dialkanolamine is N-phenyl diethanolamine.
3. The composition of claim 1 wherein the dicarboxylic acid anhydride is maleic anhydride.
4. The composition of claim 1 wherein the dicarboxylic acid anhydride is phthalic anhydride.
5. The composition of claim 1 wherein the dicarboxylic acid anhydride is tetrachlorophthalic anhydride.
6. The composition of claim 1 wherein the dicarboxylic acid anhydride is hexachloroendomethylene tetrahydrophthalic anhydride.
7. The polymerizable composition of claim 1 wherein the said aryl dialkanolamine has the empirical formula

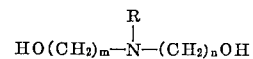

wherein R is an aryl radical and $m$ and $n$ are integers from 1 to 6.

8. In the method for polymerizing unsaturated polyester resin compositions polymerizable in the presence of peroxy initiators, said compositions including (A) polymerizable polyester of glycol and dicarboxylic acid wherein at least a portion of the dicarboxylic acid possesses alpha-beta ethylenic unsaturation, and (B) monomeric cross-linking reagent having at least one terminal ethylenic group, the improvement comprising adding to said composition a small activating amount of a half-ester formed by reacting (a) an aryl dialkanolamine and (b) a carboxylic compound selected from the class consisting of the acid anhydrides of maleic, phthalic, tetrachlorophthalic, endomethylene tetrahydrophthalic and hexachloroendomethylene tetrahydrophthalic acids.

9. The method of claim 8 wherein the aryl dialkanolamine is N-phenyl diethanolamine.

References Cited by the Examiner
UNITED STATES PATENTS
2,812,313  11/1957  Nischk et al. _____ 260—870

FOREIGN PATENTS
833,584  4/1960  Great Britain.

MURRAY TILLMAN, *Primary Examiner.*
SAMUEL H. BLECH, *Examiner.*
J. T. GOOLKASIAN, *Assistant Examiner.*